United States Patent
Honegger

(10) Patent No.: US 7,320,206 B2
(45) Date of Patent: Jan. 22, 2008

(54) DEVICE FOR PROCESSING FLAT OBJECTS, ESPECIALLY FOR PACKING PRINTED PRODUCTS

(75) Inventor: Werner Honegger, Bäch (CH)

(73) Assignee: Ferag AG, Hinwil (CH)

( * ) Notice: Subject to any disclaimer, the term of this patent is extended or adjusted under 35 U.S.C. 154(b) by 331 days.

(21) Appl. No.: 10/524,966

(22) PCT Filed: Jul. 7, 2003

(86) PCT No.: PCT/CH03/00449

§ 371 (c)(1),
(2), (4) Date: Feb. 18, 2005

(87) PCT Pub. No.: WO2004/018297

PCT Pub. Date: Mar. 4, 2004

(65) Prior Publication Data

US 2006/0042759 A1   Mar. 2, 2006

(30) Foreign Application Priority Data

Aug. 20, 2002   (CH)   ................................ 1426/02

(51) Int. Cl.
B65B 9/02 (2006.01)
B65B 51/10 (2006.01)
(52) U.S. Cl. ...................... 53/553; 53/373.5; 53/374.6; 53/375.4
(58) Field of Classification Search ............ 53/373.5, 53/374.5, 374.6, 375.4, 545, 553; 156/553, 156/555, 582, 583.5; 493/197
See application file for complete search history.

(56) References Cited

U.S. PATENT DOCUMENTS 3,394,245 A * 7/1968 Waldrop ...................... 156/582

(Continued)

FOREIGN PATENT DOCUMENTS

DE         35 28 634 A1     2/1987

(Continued)

OTHER PUBLICATIONS

WO 00/64738, Method and Apparatus for Packaging Printed Articles Such as Newspapers in Sheet Wrappers, Publication Date: Apr. 19, 2000.

Primary Examiner—Louis Huynh
(74) Attorney, Agent, or Firm—Rankin, Hill, Porter & Clark LLP

(57) ABSTRACT

For processing flat objects (10), in particular for packing printed products or small groups thereof, using a continuous packing material, the objects are conveyed in a conveying stream in which they are arranged in succession and essentially parallel to the conveying direction, and possibly between two layers of packing material, along a part of the periphery of a processing drum (1). The processing drum (1) has axially extending support elements (2) and tool elements (3) regularly alternating around its periphery. A radial position of the supporting and tool elements is adjustable, to accommodate varying formats of the objects to be processed. The processing drum also includes a pressing belt (4) extending from an entry point (A) to an exit point (B) on the drum periphery and holding and pressing the objects being conveyed on the drum periphery against the tool elements. To render further adjustments unnecessary when the radial position of the support and tool elements is changed, the pressing belt (4) is arranged to guide the objects on to and/or off the periphery of the processing drum.

28 Claims, 5 Drawing Sheets

U.S. PATENT DOCUMENTS

| | | | |
|---|---|---|---|
| 3,498,019 A * | 3/1970 | Rait | 53/450 |
| 3,509,799 A * | 5/1970 | Hartbauer et al. | 53/553 |
| 3,585,097 A | 6/1971 | Beason | |
| 3,616,042 A * | 10/1971 | Beyer et al. | 156/311 |
| 4,305,240 A | 12/1981 | Grevich et al. | |
| 4,306,400 A * | 12/1981 | Coleman et al. | 53/374.5 |
| 4,642,084 A * | 2/1987 | Gietman, Jr. | 493/197 |
| 4,758,293 A * | 7/1988 | Samida | 156/553 |
| 5,094,657 A * | 3/1992 | Dworak et al. | 53/374.6 |
| 5,131,973 A | 7/1992 | Feldkamper | |
| 5,230,268 A | 7/1993 | Richter | |
| 5,792,306 A * | 8/1998 | Verbeiren | 156/555 |
| 6,145,562 A | 11/2000 | Voss | |

FOREIGN PATENT DOCUMENTS

| | | |
|---|---|---|
| EP | 0 588 764 A2 | 3/1994 |
| GB | 1 409 077 | 10/1975 |

\* cited by examiner

DEVICE FOR PROCESSING FLAT OBJECTS, ESPECIALLY FOR PACKING PRINTED PRODUCTS

BACKGROUND OF THE INVENTION

1. Field of the Invention

The invention lies in the field of processing piece good concerns an installation according to the generic term of the first independent claim. The installation according to the invention serves the processing of flat objects, in particular of printed products, e.g. the packing of individual printed products or small groups thereof.

2. Description of Related Art

For many different kinds of processing such as e.g. binding, trimming, labelling, packing, etc., printed products are conveyed in conveying streams into a processing station and away from it. In such conveying streams the printed products lie, for example, on a conveying surface, such that they are arranged essentially parallel to the conveying direction. Advantageously the processing station is equipped in such a way that conveyance of the printed products need not be interrupted during processing but can be operated continuously. This implies that tools which have to act on the printed products during a predetermined time must be conveyed together with the printed product for the predetermined time, such that there is no relative speed with regard to the products, at least in the conveying direction.

If, for the processing the printed products in such conveying streams, only product edges need to be accessible, the printed products are usually arranged overlapping each other (imbricated stream). Therein the size of the accessible product part depends on product spacing (distance between imbricated products, i.e. distance between, for example, downstream edges of successive products). The accessible part of the product does not depend on the format of the printed product, as such. The product spacing is therefore adjusted to the nature of processing and can be maintained even if the format changes.

If the entire surface of the products must be accessible for the processing of printed products in conveying streams in which the products are arranged parallel to the conveying direction, the printed products are to be arranged consecutively on the conveying surface, without overlapping. For such conveyance the format of the product, i.e. their expansion in conveying direction, becomes relevant for the product spacing (distance between, for example, downstream edges of successive products). If diverse product formats are to be conveyed and processed in such a conveying stream without corresponding adjusting measures, the product spacing has to be adjusted to the largest format to be processed, i.e. the greatest product length to be expected in conveying direction. The product spacing (distance between, for example, downstream edges of successive products) then does not change and the gaps between products (distance between trailing edge of a product and downstream edge of the following product) are smallest for the largest products and greater for all the other products, depending on format. Conveyance of unnecessarily large gaps, which implies unnecessarily high conveying speed to achieve equal conveying capacity, is nevertheless an economical disadvantage.

This economical disadvantage becomes particularly relevant if it does not only concern the conveying speed but also the use of material for the processing. This applies to the use of an auxiliary material that is continuously supplied to the conveying stream and spans across the products and the gaps. For economical or other reasons such material ought to be limited to the amount required by a specific format.

A typical example of processing flat objects in a conveying stream using an auxiliary material, which is continuously supplied to the conveying stream, is the packing of objects with the aid of a packing material such as a plastic foil supplied from a reel. Therein it would be desirable, for economical reasons as indicated above as well as for other reasons (e.g. stability and aesthetic appearance of the packaging), to adjust the length of the supplied packing material for each object to be packed as precisely as possible to the size (format) of the object.

Publication EP-0588764 discloses an installation in which printed products, which are conveyed essentially at right angles to the conveying direction, are packed during continuous conveyance using a packing material supplied from a roll. The installation is a drum with radial conveying compartments, open at the drum periphery. The packing material is drawn from the roll and is continuously pulled to the bottom of each conveying compartment, thus forming a V-shaped pocket in each conveying compartment by zig-zagging from compartment to compartment. The printed products to be packed are positioned in these pockets, the packing material is severed between the conveying compartments and the severed piece of packing material is sealed around the printed product in each compartment. The appropriate tools for drawing in, severing and sealing the packing material are provided in each conveying compartment. Obviously, objects of varying formats can be packed in this installation, but the size of the piece of packing material severed for each package is always the same and only depends on the size of the conveying compartment.

The installation described in the publication WO-00/64738 in essence serves the same purpose as the installation according to EP-0588764 and likewise comprises a processing drum, wherein the objects to be packed are conveyed consecutively and parallel to the conveying direction around a part of the drum periphery, together with the packing material. Tools for transverse sealing and severing of the packing material are arranged at this drum periphery and they move around this periphery together with the objects to be packed and the packing material. In this installation too, objects of varying sizes can be packed, but here too, the format of the packaging remains the same.

If single printed products or groups of printed products of a single format but varying thickness are to be packed in the aforementioned installations, it is already no longer possible to produce packages using only a minimum of the packing material by fitting it tightly around the printed products, because a thicker product requires, parallel to the conveying direction, a slightly longer piece of packing material. This applies in particular to printed product which are loosely folded, i.e. not bound, and therefore, in most cases not trimmed either (e.g. daily newspapers), such that their thickness has an effect on the breadth of the folding edge and therefore on the product expansion in conveying direction also. If variations of thickness have to be reckoned with, the installations must be adjusted to products having the largest thickness to be expected. For all thinner products the packaging material does not fit tightly around the product and is larger than absolutely necessary.

The same applies if varying packing materials necessitating varying seam widths are to be processed, or if the transverse seams are to be performed in varying ways requiring a web of packing material of greater or lesser width.

In the publications DE-3528634, U.S. Pat. No. 4,305,240 or GB-1409077 installations are described in which, again by means of drum-like installations, a continuous packing material is sealed at right angles by welding jaws arranged on the drum periphery. In order to achieve varying distances between the transverse seams, it is suggested that the welding jaws are arranged in a radially adjustable manner. With these installations, objects of varying sizes and/or varying gaps between objects can be sealed into a continuous packing material in the manner described above. However, as the processing drum comprises various diameters, depending on the radial adjustment of the welding jaws, it is necessary for the packing material to be of sufficient firmness in order to convey itself and the objects to be packed without further support across a last stretch of the path on to the drum periphery and/or across a first stretch of the path away off the drum periphery. Therefore, these installations can not be used for packing material unable to fulfil such conditions due to insufficient stability, and they are not at all suitable for processing methods which do not require a continuously supplied auxiliary material.

SUMMARY OF THE INVENTION

The installation according to the invention corrects at least some of the deficiencies noted in the art. It is therefore an object of the invention to create an installation for processing flat objects conveyed in a conveying stream consecutively (not overlapping each other) and arranged parallel to the conveying direction, in particular for processing areas of the downstream and upstream edges of the flat objects. The installation comprises a processing drum with processing elements arranged on its periphery, which elements are radially adjustable such that they can be adjusted for varying gaps between objects to be processed or for maintaining these gaps constant with varying product formats. The installation is to be equipped such that the adjustment of the processing elements does not necessitate any further adjustment and does not put any conditions on the materials to be processed with regard to form (continuous or not) or mechanical stability. In particular, the installation according to the invention is to facilitate tight-fit packaging of the objects of the conveying stream with continuously supplied packing material, essentially independent of thickness and size of the objects, as well as largely independent of the nature of the package to be produced, even if the stability of the packing material is sufficient only for the packing function but not for a supporting and conveying function.

The installation according to the invention comprises a supply means, a removal means, and a processing drum situated between the supply and removal means. The supply means, and if necessary also the removal means, is equipped for conveying flat objects arranged consecutively (not overlapping) parallel to the conveying direction. The processing drum is driven in rotation around its essentially horizontal axis and comprises support elements and tool elements and a continuously revolving pressing belt. The support elements and tool elements are arranged regularly alternating around the periphery of the drum. They extend parallel to the drum axis, and can be radially displaced. The pressing belt runs along a part of the drum periphery at the same speed as the periphery and, advantageously, is driven by the drum. The pressing belt serves, on the one hand, to press material to be processed against the tool and supporting elements during its course along the drum periphery. On the other hand, the pressing belt serves to convey this material along the last stretch of its path towards the drum periphery and/or across the first stretch of its path away from it. Therefore, the pressing belt forms at least a part of the supply means and/or of the removal means. As a result of this, the supply means and/or the removal means need not be adjusted with regard to varying drum radii (varying radial positions of support elements and tool elements), yet the material to be processed is conveyed in a supported manner at all times.

The tool elements and the support elements are advantageously all effectively connected to one control means such that, by activating the control means, all support and tool elements are radially adjusted together. It is also possible to provide a separate control means for the support elements and one for the tool elements.

On displacing the support elements and tool elements outwards (to a larger distance from the drum axis) the distances between the tool elements become larger, and gaps between objects of a same size become larger. On displacing the elements inwards the distances between the support elements and the tool elements become smaller. Therein, the timing of conveyance and processing remains the same at a constant rotation speed, regardless of the setting of the support and tool elements. If necessary, the width (at right angles to the axial expansion) of the support elements can be adjusted to the distance between the tool elements set by their radial setting. The length of the pressing belt extending along the periphery of the drum, which length varies with the radial positioning of support and tool elements, or with a varying drum radius respectively, is compensated, for example, by a deflection roller for the pressing belt being arranged in a resilient manner.

If the installation according to the invention is equipped for packing objects conveyed along the periphery of the processing drum, it further comprises means for supplying the packing material to the supply stream of the objects, and the tool elements of the processing drum are designed as means for transverse joining of the packing material and possibly as removal means (for example, as per se known thermal welding and severing means in the case of the packing material being made of a thermoplastic material). A supplied stream of objects, with a conveying sequence being adapted to the rotation speed of the processing drum, is passed on to the supply means, or the pressing belt, forming a conveying stream of printed products arranged consecutively with a predetermined spacing. The packing material is supplied to this conveying stream from two sides, or from one side with appropriate wrapping around the conveying stream, such as, for example, described in the publication EP-1188670. The conveying stream thus covered on both sides, or in a tubular fashion, by the packing material then moves on to the processing drum, the conveying stream and the processing drum being synchronized in such a way that the tool elements are positioned in the gaps between the objects. During conveyance of the stream along a section of the drum periphery the tool elements, possibly accordingly activated, perform the transverse seaming of the packing material around the objects. The longitudinal seaming can be performed in the area of the supply means or of the processing drum, or it can not be performed at all (packaging with banderole). In addition to the transverse seaming, the packed objects can also be completely or partly separated during conveyance along the processing drum periphery.

BRIEF DESCRIPTION OF THE DRAWINGS

These and further features of the invention will be apparent with reference to the following drawings, wherein.

DETAILED DESCRIPTION OF THE PREFERRED EMBODIMENTS

Figure 1:
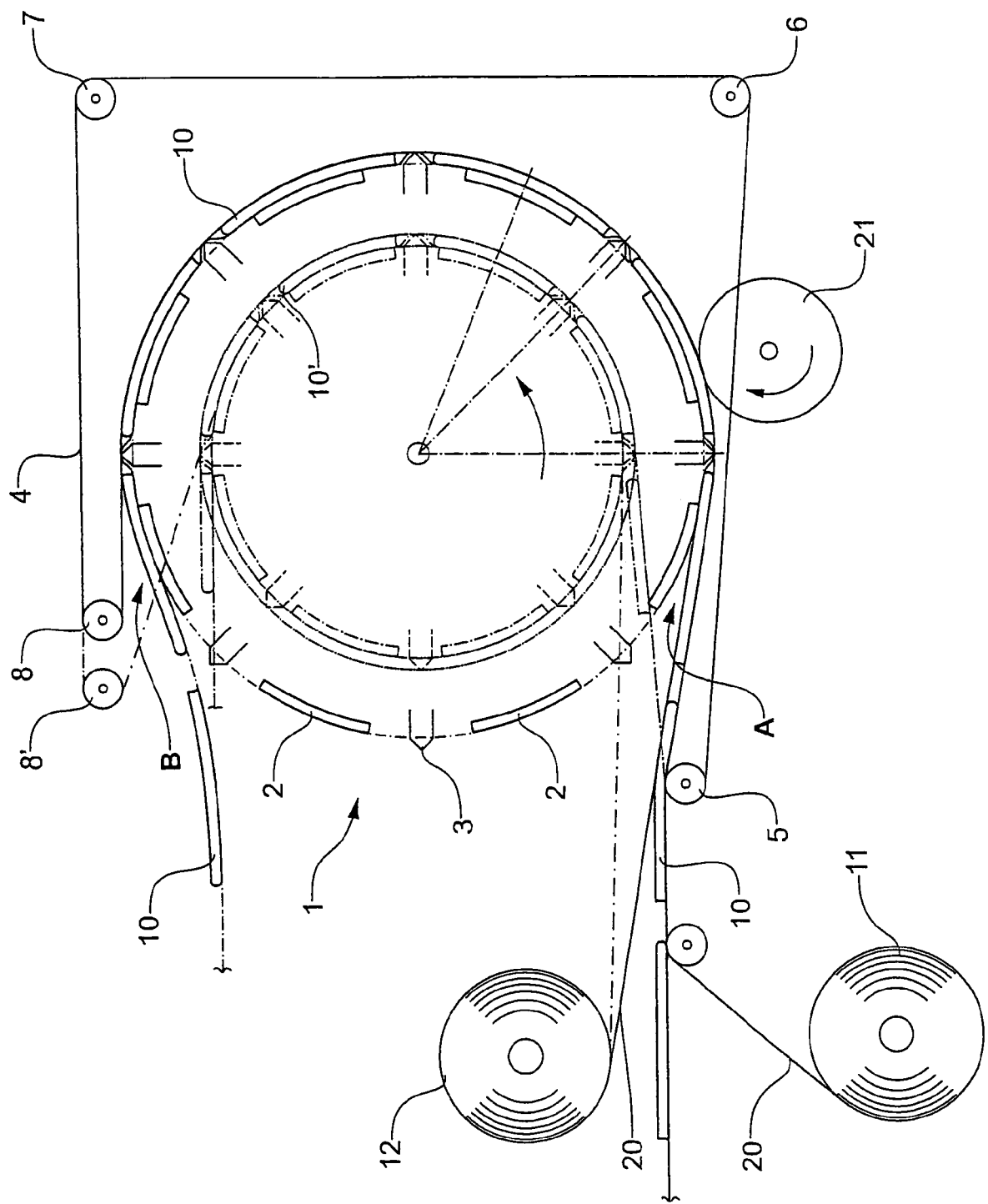
FIG. 1 schematically illustrates an installation according to the invention.

FIG. 1 shows very schematically an exemplary embodiment of the installation according to the invention. This is viewed parallel to the axis of the processing drum 1 and in two separate setting modes (drawn in complete and chain lines) with regard to the distance between the tool elements for processing, for example, two different formats of flat objects 10 and 10'.

The installation comprises, as already explained above, a processing drum 1 with an essentially horizontal axis, comprising support elements 2 and tool elements 3 arranged regularly and alternating around the periphery of the drum. These support and tool elements 2 and 3 extend axially across at least part of the drum. A pressing belt 4 is arranged around the processing drum, enabling the objects 10 to be pressed, and thus held, against the drum. The pressing belt runs across four passively rotating deflection rollers 5, 6, 7 and 8. The deflection rollers are arranged such that the pressing belt runs along a part of the drum periphery 1 from an entry point A to an exit point B. One of the deflection rollers (e.g. deflection roller 8) is spring mounted (positions 8 and 8') to keep the pressing belt 4 taut at varying peripheries and varying thickness of the objects.

The deflection roller 5 of the pressing belt 4, being the last one before the entry point in its machine direction, is positioned such that the pressing belt 4 approaches the drum 1 from below. Thus, the pressing belt 4 can convey loosely placed objects to be processed and, if required, support a continuous packing material to the periphery of the drum. Acting as a last part of the supply means, the pressing belt 4 should proceed as horizontally as possible between the deflection roller 5 and the entry point A. The pressing belt 4 being driven by the processing drum 1 (passively revolving deflection rollers), the speed of this last part of conveyance essentially corresponds with the speed of the periphery of the processing drum 1, regardless of the setting of the support and tool elements. As the position of the deflection roller 5 remains constant independently of the drum radius, the objects to be processed can be passed on to the pressing belt in this area by any conveying means in a manner that is also independent of the drum diameter.

Figure 4:
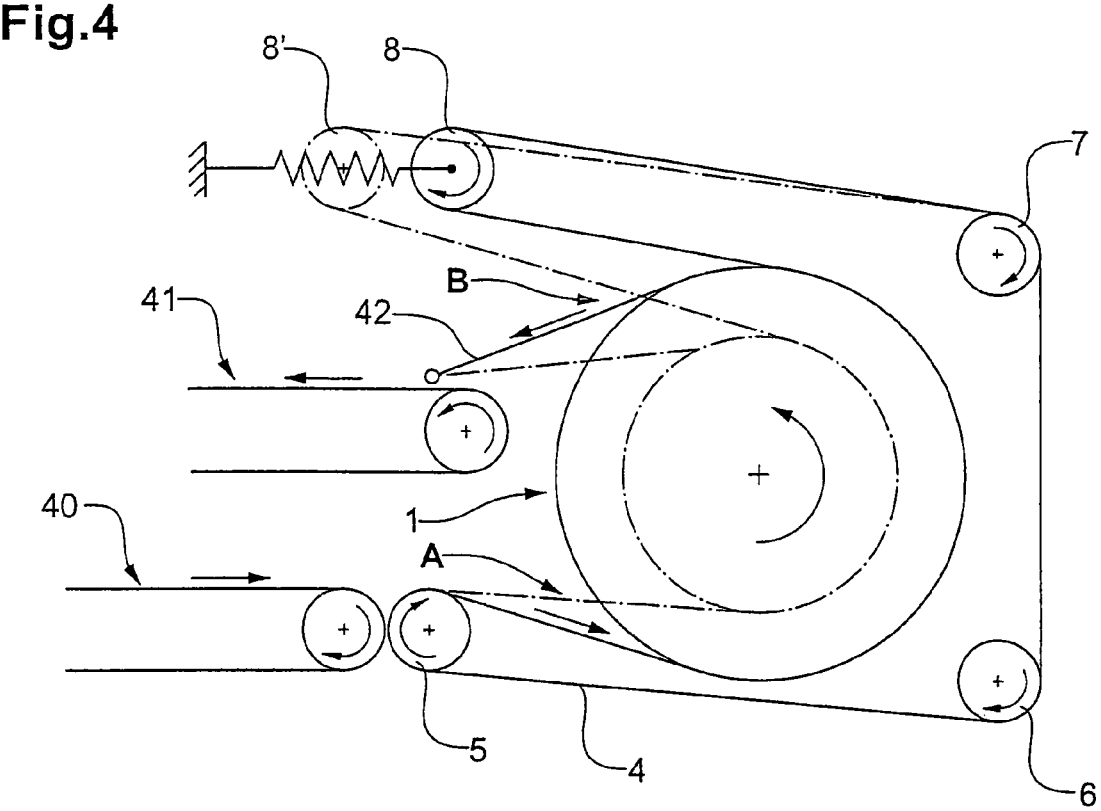
FIG. 4 to 6 show three further schematically illustrated embodiments of the installation according to the invention; and, FIG. 7 shows a further embodiment of the removal area of an installation according to FIG. 1 or 4.
Figure 5:
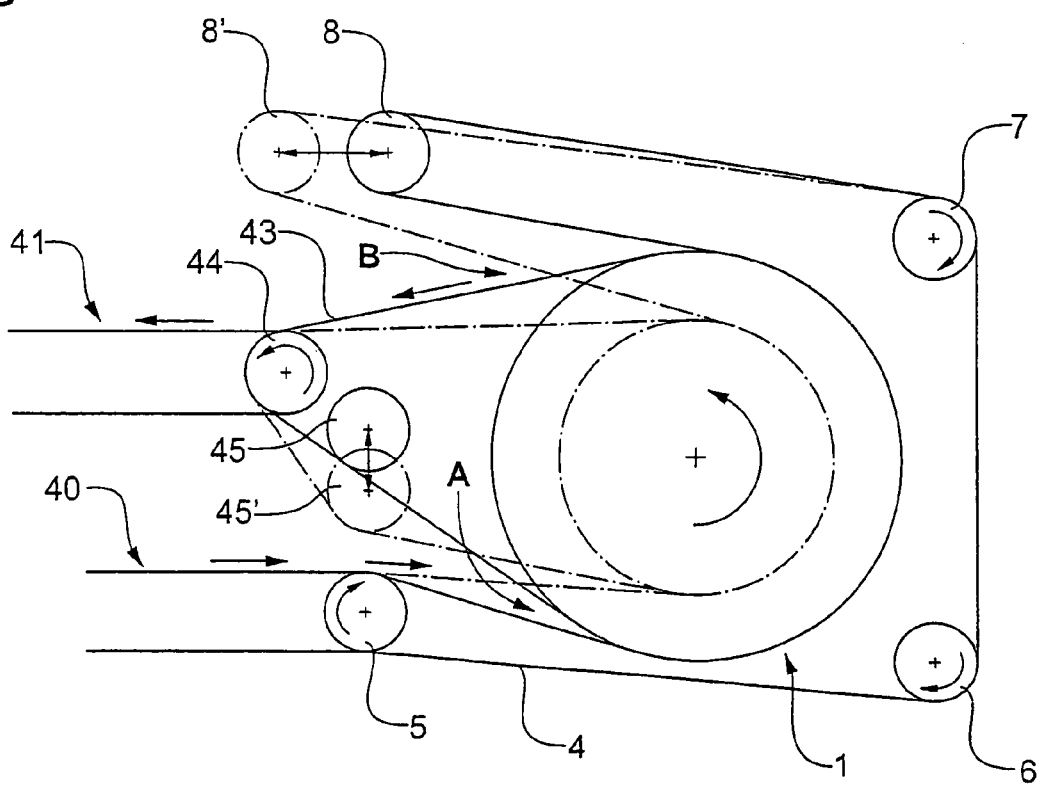
Figure 6:
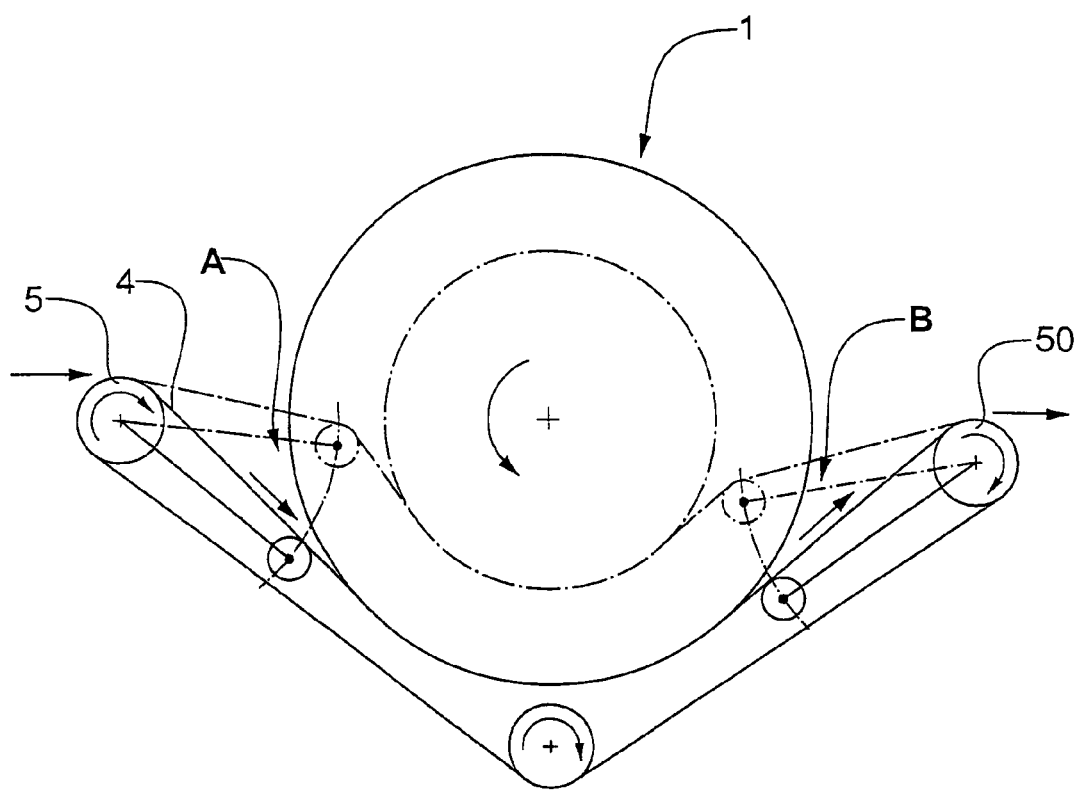

FIG. 1 does not show a removal means. As the processed objects (e.g. packed and separated from each other) leave the hold of the pressing belt 4 at the top of the drum (exit point B), they can simply be left to fall down a corresponding ramp into a collecting container. The ramp swivels according to changes in the drum radius. Further embodiments of removal means are illustrated in FIGS. 4 to 6.

The embodiment of the installation according to the invention illustrated in FIG. 1 is equipped to pack flat objects 10 and 10'. For this purpose, a web of packing material 20 is supplied to the conveying stream of the flat objects prior to the entry point by an upper and a lower roll 11 and 12. The packing material is drawn into the entry point A on both sides of the conveying stream together with the flat objects.

For example, the packing material 20 is a weldable plastic foil and the tool elements 3 are in the simplest case axial filaments slightly protruding from the drum periphery defined by the support elements 2 and being continuously heated. The side of the pressing belt 4 facing the processing drum is Teflon-coated. As soon as the two layers of plastic foil are compressed against the Teflon-coating of the pressing belt 4 between two objects by a filament, they are welded together and consequently separated as the filament continues to work and is pushed through both layers.

Welding and separating a common packaging foil as described above takes at least two tenths of a second. In the embodiment illustrated in FIG. 1, four conveying time cycles are available for the welding and separating steps, which means that the installation as shown can achieve a capacity of up to 20 packets per second. Even higher capacities may be achieved by constructing the installation such that two, or even several parallel conveying streams run along the processing drum periphery, as suggested for a linear system in the publication EP-1188670. Capacities can also be increased by guiding the conveying stream along a greater part of the processing drum periphery and/or by increasing the number of tool elements arranged along the drum periphery (the drum radius being extended accordingly).

The longitudinal seam of the two lengths of packaging material is produced by a heated welding reel 21 of which one is arranged on either side of the pressing belt 4 in the area of the processing drum 1 and acting on the packaging material protruding alongside the objects. The longitudinal seam may also be produced upstream of the entry point A in the area of the supply means.

Figure 2:
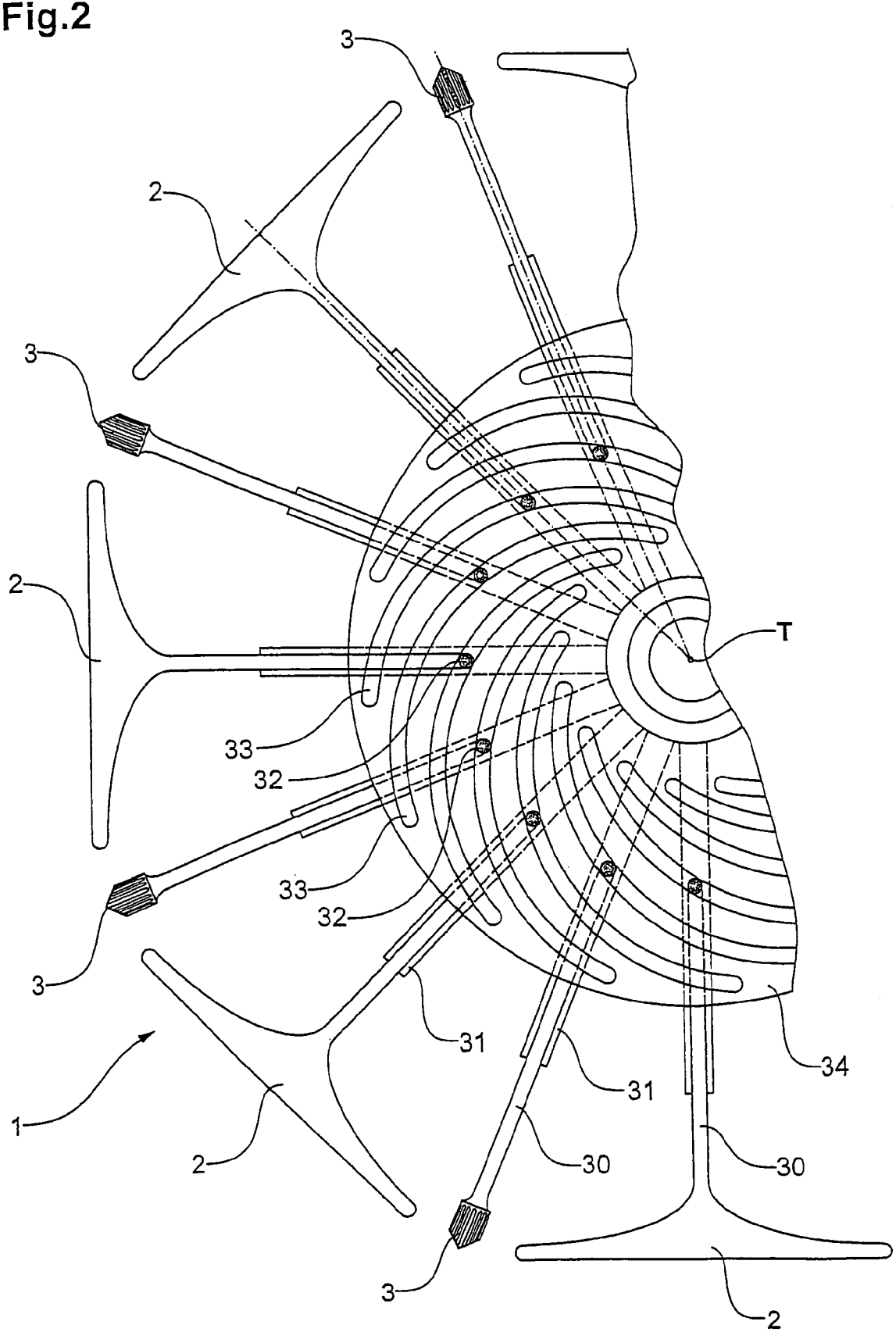
FIG. 2 is a section of an exemplary embodiment of the processing drum of the installation according to the invention.

FIG. 2 shows a front end of an exemplary processing drum 1 applicable in an installation according to the invention. The support elements 2 and tool elements 3 are each mounted on a radial support 30, which is guided to be radially adjustable in a guide 31 and comprises at its inner end an axial control bolt 32. The control bolts 32 move within spiral control ports 33 of a control disk that is rotatable around the drum axis T relative to the arrangement of the support and the tool elements. In the case illustrated a clockwise turn of the control disk displaces the support and the tool elements outwards, an anti-clockwise turn inwards.

The support elements 2 of the embodiment according to FIG. 2 have level surfaces, and therefore are suitable for processing non-flexible objects; this is in contrast to the support elements illustrated in FIG. 1, which are curved with a radius adapted to a medium drum radius.

For enabling production of various kinds of transverse seams the tool elements may be exchangeable, wherein their radial position would also have to vary in relation to the support elements. In such a case it is advantageous to provide a separate control means for each the support elements 2 and for the tool elements 3. Similarly to the embodiment according to FIG. 2, two control disks 34 with eight control ports 33 each are provided, instead of one control disk with sixteen control ports. Therein, one control disks can be arranged on each face end of the processing drum 1.

FIGS. 3A to 3D show exemplary packages of printed products or small groups thereof, all of which are shown in the same format but for which different gaps between the printed products are necessary. Such different gaps are easily handlable using the installation according to the invention.

Figure 3A:
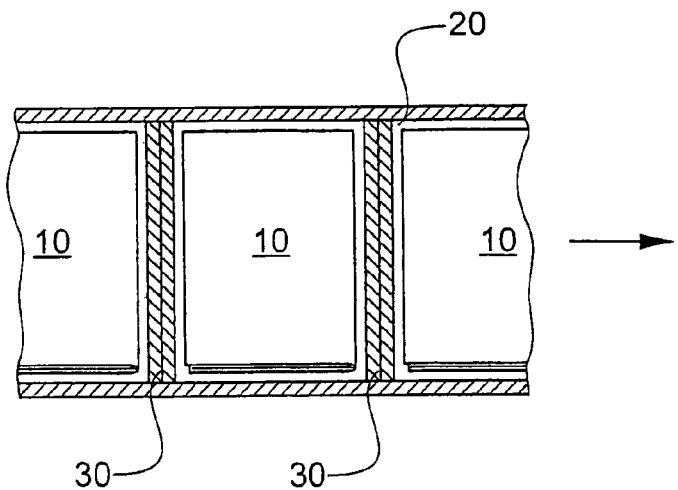
FIG. 3A to 3D show examples of packed objects of equal dimensions, such as printed products or small groups of printed products, which can be produced by the installation according to the invention.

According to FIG. 3A the packing material is joined with a transverse seam 30 and separated in the middle thereof. If the packing material is weldable and the demands on the seams and on the neatness of separation are not very high, this kind of transverse seam and separation can be performed by the aforementioned filaments, with the transverse seam being of minimal width. For higher demands, the transverse seam must be broader and, therefore, requires wider gaps between the printed products to be packed. The transverse seams are then advantageously produced using welding jaws and separate separating means, wherein both may be integrated in each tool element such that they are able to move in relation to each other. The separating means may also be equipped for an incomplete separation (perforation), or they may not be provided at all, so that the packaged printed products exiting at the exit point can be deposited in the shape of a folding stack or can be wound on to a coil and advanced in such a form.

If the packing material cannot be welded, the seam can be produced by embossing, by separation and consequent folding, or by other suitable per se known methods. For each case the tool elements are to be equipped and the distances between them are to be adjusted accordingly.

Figure 3B:
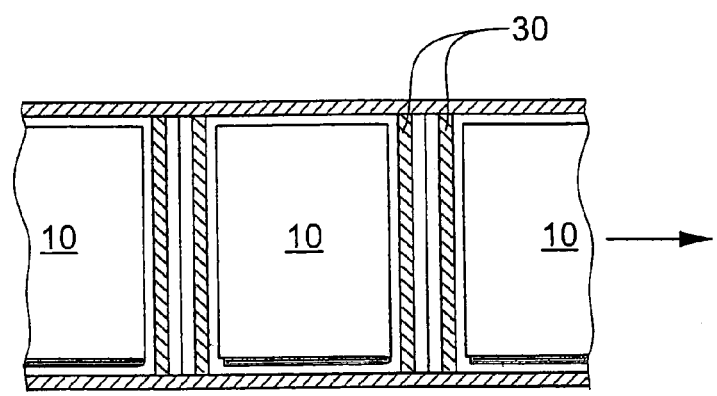

FIG. 3B shows a transverse joint consisting of two transverse seams 30 each and separation between the two transverse seams, the separation being again not necessarily complete.

Figure 3C:
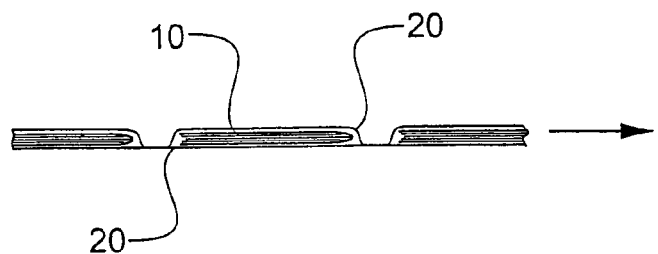
Figure 3D:
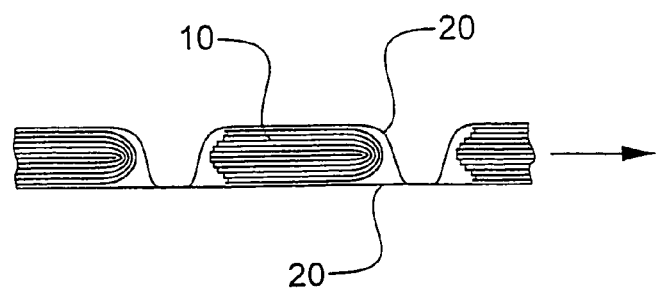

FIGS. 3C and 3D illustrate the gap adjustment that is necessary for printed products having the same format but not the same thickness. If, for example, a daily newspaper is to be packaged in the manner described, a corresponding adjustment can easily be performed on a daily basis using an installation according to invention.

FIGS. 4 to 6 show three further exemplary embodiments of the installation according to invention, which are illustrated in a very schematic manner and which differ from the installation according to FIG. 1 in particular regarding the arrangement of the pressing belt and the construction of the supply means and/or the removal means. Identical elements are designated with the same reference numerals as in the preceding drawing figures. All embodiments are shown with a greater drum radius (drawn-out lines) and with a smaller drum radius (chain lines). It is clearly evident from FIGS. 4 to 6 that operating the installation according to the invention makes no demands on the firmness of a continuous material conveyed to the processing (e.g. packaging material), as the objects to be processed are supported at all times during conveyance. It is therefore also possible to use the installation for processes not using such a material.

The installation according to FIG. 4 comprises the same arrangement of processing drum 1 and pressing belt 4 as the installation according to FIG. 1. The pressing belt serves as the last part of the supply means conveying the recumbent objects to be processed to the periphery of the processing drum 1, wherein this part of the supply means automatically adapts to a varying drum diameter. A further part of the supply means (e.g. conveyor belt 40) therefore need not be equipped for any adjustments.

The removal means also comprises a fixed non-adjustable removal belt 41, and a hinged ramp 42 down which the processed objects slide on to the removal belt 41. For the position of ramp 42 to be automatically adapted to the drum periphery, the ramp is advantageously supported, possibly on rollers, on both sides of the conveying path of the objects by drum elements having a radial position which is adaptable together with the support and tool elements.

FIG. 5 shows a further embodiment of the installation according to the invention, again comprising a processing drum 1 and a pressing belt 4, as also shown in FIGS. 1 and 4. The installation comprises, as the first part of the removal means, a further belt 43 extending along a part of the drum periphery and arranged between the drum periphery and the pressing belt 4. The further belt assumes the function of a first part of the removal means, adapting automatically to a varying drum diameter due to an appropriately arranged deflection roller 44 (first deflection roller of said belt following the exit point). Processed objects exiting at the exit point are removed from the drum periphery lying on the further belt and then by a fixed removal belt 41. The further belt 43 also comprises a spring mounted deflection roller 45 (and 45') which both keeps the further belt 43 under tension and compensates for the varying drum diameter.

As the tool elements must access the objects or a packing material through the further belt 43 extending along the drum periphery, the belt is designed, for example, as a plurality of pitched parallel strings and the tool elements comprise gaps through which the strings extend. The removal belt 41 may also consist of a plurality of strings, each running between two strings of the further belt 43 around the deflection roller 44, thus creating an uninterrupted removal means whose first part, facing exit point B, automatically adapts to a varying drum diameter.

Similarly, the pressing belt 4 and the supply belt 40 may consist of part belts or strings running alternately around deflection roller 5.

The conveying path of the objects that have are to be processed or are already processed, is indicated by arrows in FIG. 5. This path leads along the supply belt 40 and the pressing belt 4 to the entry point A, from there along the drum periphery to the exit point B, and from there along the further belt 43 on to the removal belt 41. Obviously, the installation may also be operated in the opposite direction so that the pressing belt 4 forms the first part of the removal means and the further belt 43 the last part of the supply means.

FIG. 6 shows an embodiment of the installation according to the invention, in which, with the aid of a last deflection roller 5 before the entry point and a first deflection roller 50 after the exit point, the pressing belt 4 serves as the last part of the supply means as well as the first part of the removal means. These parts automatically adapt to a varying drum diameter and can be connected to a stationary part of a further conveying means.

Figure 7:
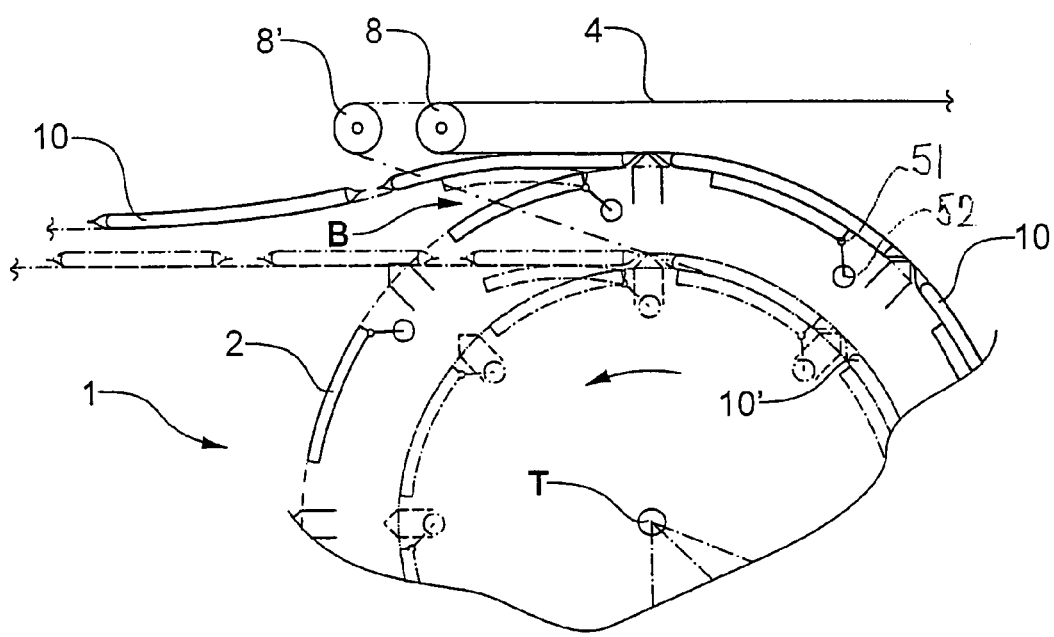

FIG. 7 shows, like in FIG. 1, a further embodiment of the exit point B, which may be applied in the installations according to FIGS. 1 and 4. The support elements 2 of the processing drum are designed to be able to pivot around an axis 51 located on the trailing side of the element and they comprise control rollers 52 on the other side of the axis. During drum rotation the control rollers 52 run along a cam (not illustrated) which is stationary during operation but whose radial position is adjustable together with the radial position of the support and processing elements. The cam is designed such way that the support elements are pivoted around the axis at the exit point B, to spread the downstream edges of the support element away from the drum periphery in order to pass the processed objects on to a removal means (not illustrated).

The invention claimed is:

1. An installation for processing flat objects (10) conveyed consecutively in a conveying direction, said installation comprising:
   a processing drum (1) being driven in rotation around an essentially horizontal axis (T) and comprising, arranged at a drum periphery, regularly alternating support elements (2) and tool elements (3) that extend axially and whose radial position is adjustable,
   a supply means for conveying the objects to an entry point (A) at the drum periphery,
   a removal means for conveying the objects away from an exit point (B) at the drum periphery, and
   a pressing belt (4) running from a first deflection roller (50) to the entry point, and on the periphery of the processing drum to the exit point and to a second deflection roller (5),
   wherein a pressing belt entry section between the first deflection roller and the entry point constitutes a last part of the supply means by the first deflection roller being arranged at a distance from the drum periphery and adjoining a further part of the supply means and by the pressing belt entry section being arranged to be capable to support and convey the objects to the entry point, and
   wherein the entry point (A) is situated in a lower area of the processing drum, and the exit point (B) is situated in an upper area of the periphery of the processing drum (1), the pressing belt (4) forms the last part of the supply means, a further belt (43) is arranged to run between the periphery of the processing drum (1) and the pressing belt (4) and to run on the periphery of the processing drum (1) between the entry point (A) and the exit point (B), and wherein the further belt (43) is arranged, by way of another first deflection roller (44), after the exit point to form a first part of the removal means.

2. The installation according to claim 1, wherein the further belt (43) consists of a plurality of pitched parallel closed loop strings.

3. The installation according to claim 1, wherein the support elements (2) and the tool elements (3) are interconnected with a control means such that, by activating the control means, all support elements (2) and/or all tool elements (3) are simultaneously displaced radially.

4. The installation according to claim 1, wherein the support elements (2) have an axial extension and comprise a variable width at right angles to their axial extension.

5. The installation according to claim 1, wherein, for differing processes, the tool elements (3) are exchangeable.

6. The installation according to claim 1, wherein the installation also includes further supply means (11, 12) to supply a web of an auxiliary material such that the auxiliary material and the objects move along the drum periphery together.

7. The installation according to claim 6, wherein the tool elements (3) are equipped to at least partly separate the auxiliary material between the objects.

8. The installation according to claim 7, wherein the auxiliary material is a packing material (20) and the further supply means (11, 12) are designed such that the packing material (20) travels on both sides of the objects (10) on the processing drum (1).

9. The installation according to claim 8, wherein the packing material (20) is a weldable packaging foil and that the tool elements (3) comprise welding means.

10. The installation according to claim 9, wherein the tool elements (3) comprise welding wires extending in the direction of an axis of the processing drum (1), said welding wires protrude from the drum periphery defined by the support elements (2) and are essentially continuously heated and co-operate with a Teflon-coating on the pressing belt (4).

11. The installation according to claim 6, wherein the auxiliary material is a packing material (20) and the further supply means (11,12) are designed such that the packing material (20) travels on both sides of the objects (10) on the processing drum (1).

12. The installation according to claim 11, wherein the packing material (20) is a weldable packaging foil and that the tool elements (3) comprise welding means.

13. The installation according to claim 12, wherein the tool elements (3) comprise welding wires extending in the direction of an axis of the processing drum (1), said welding wires protrude from the drum periphery defined by the support elements (2) and are essentially continuously heated and co-operate with a Teflon-coating on the pressing belt (4).

14. The installation according to claim 1, wherein the installation is configured for packing printed products or small groups of printed products.

15. An installation for processing flat objects (10) conveyed consecutively in a conveying direction, said installation comprising:
   a processing drum (1) being driven in rotation around an essentially horizontal axis (T) and comprising, arranged at a drum periphery, regularly alternating support elements (2) and tool elements (3) that extend axially and whose radial position is adjustable,
   a supply means for conveying the objects to an entry point (A) at the drum periphery,
   a removal means for conveying the objects away from an exit point (B) at the drum periphery, and
   a pressing belt (4) running from a first deflection roller (50) to the entry point, and on the periphery of the processing drum to the exit point and to a second deflection roller,
   wherein a pressing belt exit section between the exit point and the second deflection roller constitutes a first part of the removal means by the second deflection roller being arranged at a distance from the drum periphery and adjoining a further part of the removal means and by the pressing belt exit section being arranged to be capable to support and convey the objects away from the exit point, and
   wherein the entry point (A) is arranged in an upper area of the processing drum, and the exit point (B) in a lower area of the periphery of the processing drum (1), forms the first part of the removal means, a further belt (43) is arranged to run between the periphery of the processing drum (1) and the pressing belt (4) and to run on the periphery of the processing drum (1) between the entry point (A) and the exit point (B), and wherein the further belt (43) is arranged, by way of another last deflection roller (44), before the entry point to form the last part of the supply means.

16. The installation according to claim 15, wherein the further belt (43) consists of a plurality of pitched parallel closed loop strings.

17. The installation according to claim 15, wherein the support elements (2) and the tool elements (3) are interconnected with a control means such that, by activating the control means, all support elements (2) and/or all tool elements (3) are simultaneously displaced radially.

18. The installation according to claim 15, wherein the support elements (2) have an axial extension and comprise a variable width at right angles to their axial extension.

19. The installation according to claim 15, wherein, for differing processes, the tool elements (3) are exchangeable.

20. The installation according to claim 15, wherein the installation also includes further supply means (11, 12) to supply a web of an auxiliary material such that the auxiliary material and the objects move along the drum periphery together.

21. The installation according to claim 20, wherein the tool elements (3) are equipped to at least partly separate the auxiliary material between the objects.

22. The installation according to claim 21, wherein the auxiliary material is a packing material (20) and the further supply means (11, 12) are designed such that the packing material (20) travels on both sides of the objects (10) on the processing drum (1).

23. The installation according to claim 22, wherein the packing material (20) is a weldable packaging foil and that the tool elements (3) comprise welding means.

24. The installation according to claim 23, wherein the tool elements (3) comprise welding wires extending in the direction of an axis of the processing drum (1), said welding wires protrude from the drum periphery defined by the support elements (2) and are essentially continuously heated and co-operate with a Teflon-coating on the pressing belt (4).

25. The installation according to claim 20, wherein the auxiliary material is a packing material (20) and the further supply means (11, 12) are designed such that the packing material (20) travels on both sides of the objects (10) on the processing drum (1).

26. The installation according to claim 25, wherein the packing material (20) is a weldable packaging foil and that the tool elements (3) comprise welding means.

27. The installation according to claim 26, wherein the tool elements (3) comprise welding wires extending in the direction of an axis of the processing drum (1), said welding wires protrude from the drum periphery defined by the support elements (2) and are essentially continuously heated and co-operate with a Teflon-coating on the pressing belt (4).

28. The installation according to claim 15, wherein the installation is configured for packing printed products or small groups of printed products.

* * * * *